United States Patent [19]

Bezos

[11] Patent Number: 5,727,163

[45] Date of Patent: Mar. 10, 1998

[54] SECURE METHOD FOR COMMUNICATING CREDIT CARD DATA WHEN PLACING AN ORDER ON A NON-SECURE NETWORK

[75] Inventor: Jeffrey P. Bezos, Bellevue, Wash.

[73] Assignee: Amazon.Com, Inc., Seattle, Wash.

[21] Appl. No.: 413,242

[22] Filed: Mar. 30, 1995

[51] Int. Cl.⁶ .............................. G06F 17/60; G06G 7/52
[52] U.S. Cl. ..................... 395/227; 235/379; 235/380; 235/381; 379/91.01; 379/88; 395/239
[58] Field of Search ............................... 395/239, 849, 395/186, 240, 227; 364/401; 235/380, 487, 381; 379/111, 91, 59, 93, 114, 120, 130, 20, 58, 60, 88, 96, 91.01, 91.02; 380/25; 340/825.33, 825.34, 825.35

[56] References Cited

U.S. PATENT DOCUMENTS 5,164,981  11/1992  Mitchell et al. ..................... 379/88

OTHER PUBLICATIONS

Loshin, P., "Selling Online With . . . First Virtual", Chapters 3 and 4, Charles River Media, Inc. 1996.
Borenstein, N. "Perils and Pitfalls of Practical Internet Commerce (Part 1)." <http://www.fv/com/company/first₃₁year 1.html>, 1996.
Morgan, L., "Cashing In—The Rush is on to Make Net Commerce Happen," Internet World, pp. 48–51, Feb. 1995.
Blankenhorn, D., "Building the Tools for Web Commerce," Interactive Age, pp. 34–36, Feb. 1995.
Sullivan, E., "Firm Has Technology You Can Bank On," PC Week, pp. 83–86, Aug. 1994.
Frezza, B., "Coin of the Realm," Network Computing, pp. 37–38, Jan. 1995.

*Primary Examiner*—Wellington Chin
*Assistant Examiner*—Melissa Kay Carman
*Attorney, Agent, or Firm*—Ronald M. Anderson

[57] ABSTRACT

A method and system for placing an order charged to a credit card, over an unsecured network. The customer completing an order for goods or services enters information required for the order, such as the shipping and billing addresses and identification of the goods, but enters only a subset of the credit card account number to which the order is to be charged. The order is transmitted over the Internet or other network to a remote merchant location (32) from a customer's location (10). A computer (38) at the remote merchant location processes the order to extract the data provided by the customer for storage in a database (40). During a subsequent telephone call to the remote merchant location, the customer enters the complete credit card number, preferably on a touch-tone keypad (28). The touch-tone signals are processed by an automated attendant system (44) for input of the complete credit card number into the computer. Using the portion of the complete credit card number that corresponds to the subset entered by the customer on the order form, the computer identifies the order previously placed and inserts the complete credit card number in the order data stored on the database to finalize the order.

31 Claims, 5 Drawing Sheets

*FIG. 1*

ORDER FORM

LAST NAME ___________________________
FIRST NAME ___________________________
E-MAIL ADDRESS: ______________________
SHIPPING ADDRESS:
    STREET ___________________________
    CITY _____________________________
    STATE _______________ ZIP CODE ______
BILLING ADDRESS:
    STREET ___________________________
    CITY _____________________________
    STATE _______________ ZIP CODE ______
TELEPHONE NO. (___) ___-____
CREDIT CARD: VISA __ MC __ AM EXP __ DISCOV. __
CREDIT CARD NUMBER:
    ENTER LAST 5 DIGITS ONLY: _ _ _ _ _  ⎯52
EXPIRATION DATE: __/__ ⎯54

GOODS/SERVICES ORDERED:
<u>QTY.</u>    <u>CAT. NO.</u>    <u>PRICE</u>    <u>CHARGE</u>

<u>TOTAL CHARGED:</u> ________ ⎯56

SECURE METHOD FOR COMMUNICATING CREDIT CARD DATA WHEN PLACING AN ORDER ON A NON-SECURE NETWORK

FIELD OF THE INVENTION

The present invention generally relates to a method for transferring information over a non-secure data link, and more particularly, to a method for communicating credit card data from customer to merchant, when placing an order for goods or services over the Internet or other non-secure network. This invention was described in Invention Disclosure No. 364,818, filed in the United States Patent and Trademark Office on Nov. 7, 1994.

BACKGROUND OF THE INVENTION

Catalog shopping represents an increasing part of the economy. The growth in its popularity can in part be explained because consumers have learned that goods purchased from a catalog are often much less expensive than if purchased through a normal retail store. In addition, because a customer can shop without leaving the comfort of home or office, placing an order for merchandise from a catalog makes much more efficient use of the customer's time.

Shopping for goods and services using a personal computer to place an order on a network is a natural extension to the more traditional catalog shopping, since the customer enjoys these same benefits. The COMPUSERVE™ network and other private networks have long offered members the opportunity to browse through on-line "Electronic Shopping Malls" and place orders for goods shown and described therein. New opportunities for shopping via personal computer arise daily as more people gain access to the Internet network, with its interconnectivity and easy access through the World Wide Web or E-mail.

A credit card facilitates making purchases via telephone or over the network. However, users are justifiably concerned about placing orders for merchandise on networks such as the Internet, for example via E-mail, because of the lack of secure communications. Security on public networks at the present time is virtually non-existent, making it relatively easy for an unauthorized third party to gain access to credit card data transmitted over the network. Once a dishonest person has the credit card number, thousands of dollars can be improperly charged to the customer's credit card account.

One solution to this problem is for the customer to enter, for delivery over the network, an order that does not include the customer's credit card number. To complete the order, the customer must then call the merchant on an 800 telephone number, for example, to provide the credit card number. However, this method does not enable the credit card data to be readily associated with and entered into the order previously placed by the customer. Errors in the order can easily arise. For example, the customer's credit card number can be assigned to the wrong order. In addition, there is usually a considerable delay to further inconvenience the customer while a clerk asks the customer other questions that will help to ensure the correct match between an order that was previously transmitted and the customer's credit card number given over the phone.

A similar approach for placing an order in current use is initiated when a customer sends an order, without credit card information, to a merchant over a non-secure network. After receiving the order, the merchant's clerk or an automated system sends an E-mail message to the customer containing an order number that uniquely identifies the order. Upon receiving the E-mail message, the customer dials a telephone number that connects to the merchant's facilities. In response to prompting from an automated attendant, the customer enters the unique order number and correct credit card number for billing the order on a touch-tone telephone (assuming that the customer has placed the call on this type of phone). The order number is used to match the correct order with the customer's credit card number. However, this method requires that the customer retain the unique order number assigned by the merchant for entry during the subsequent phone call.

Another approach to solving this problem is to encrypt the credit card information included in an order placed on a public network. Using the encrypted credit card data, an order can be completed in a single transaction. However, virtually all of the encryption schemes thus far developed for protecting such sensitive data have drawbacks. For example, most encryption schemes require the use of an encryption key that is known only to the party encrypting information and to the intended recipient of the information who will decrypt it. The secure distribution and safeguard of such encryption keys adds too much complexity to network shopping transactions and will likely not be readily accepted by customers. While it is possible to embed an encryption key in an application designed to take an order and transmit it over the network, the embedded encryption key can be discovered by others who may then misuse it. Even public key encryption systems require use of a "private" key that should not be disclosed to others. In addition, and perhaps more importantly, the software required for any encryption system must be distributed to prospective customers before the system can be used to transfer credit card data when a customer places an order. The widespread dissemination of such software will likely not occur for some time.

A new method for ordering goods over a network is needed that enables a customer to place an order without concern that others may illicitly gain access to the customer's credit card information. The order entry should be automated for optimum efficiency and to minimize the time required for the customer to complete an order. The present invention represents a workable solution to this problem that is relatively efficient and foolproof.

SUMMARY OF THE INVENTION

In accordance with the present invention, a method is defined for communicating credit card data in connection with a message that places an order and/or opens an account, where the message is transmitted over a non-secure network. As used throughout this specification and in the claims that follow, the term "credit card" is intended to encompass debit cards and any other form of credit or debit used to make a purchase by providing a reference number that uniquely identifies a purchaser's account from which funds used to pay a seller for goods or services will be transferred. The method includes the step of transmitting the message over the non-secure network from a local computer; the message includes only a portion of the credit card data. The message with the portion of the credit card data is received at a remote location coupled to the non-secure network and is added to a database. A telephone call is placed to the remote location to finalize the message by entering complete credit card data. The message is then matched with the complete credit card data by comparing the portion of the credit card data that was included in the message with a corresponding portion of the complete credit card data that was entered over the telephone. The complete credit card data is thus matched with and entered into the message in the database to finalize the message. As disclosed below, the message places an order and/or opens an account to place future orders.

The complete credit card data include a plurality of digits. Accordingly, the portion of the credit card data that is included with the message comprises a predefined number of the digits, substantially less than all of the digits of the complete credit card data. Preferably, the step of entering the complete credit card data comprises the step of keying the credit card data into a telephone keypad for transmission to the remote site over the telephone so that the message is completed automatically without clerical assistance. Once the message is finalized, the portion of the credit card data included in the message is no longer available for matching against complete credit card data entered during subsequent telephone calls.

Another step of the method provides for entering additional identifying data via the telephone in the event that a duplicate entry of the portion of the credit card data is found in the database. The additional identifying data are compared to corresponding identifying data in the message entered from the local computer to identify the message into which the complete credit card data should be entered in the database.

To avoid associating the credit card data with the wrong message, at least a portion of the finalized message is preferably read back to the customer on the telephone. The customer thereafter is enabled to confirm the message by making an entry on the telephone. If a problem arises in automatically finalizing the message, clerical assistance is provided during the telephone call.

Another aspect of the present invention is a system for receiving messages from a plurality of sites, each message including non-confidential data and a subset of confidential data. The non-confidential data and the subset of the confidential data are conveyed as a message over a non-secure computer network to an intended recipient to be completed by adding the complete confidential data, which are transmitted to the intended recipient over a telephone system. The system includes a computer for use in receiving the messages. The computer has a central processor that executes instructions, a memory for storing instructions to be executed, and non-volatile storage for storing the messages. Also included is a network interface that is adapted to couple the computer to the non-secure computer network, enabling the messages sent on the network to be automatically entered in the non-volatile storage. An automated attendant telephone system, coupled to the computer, is provided for automatically answering a telephone call from one of the plurality of sites to enter the confidential data for conveyance over the telephone line to the computer. A portion of the confidential data, which corresponds to the subset of the confidential data, comprises a match key. By thus accessing the automated attendant telephone system, a user is enabled to enter the confidential data that is transmitted over the telephone line, for input to the computer. A portion of the confidential data, which corresponds to the subset of the confidential data previously entered in the message, comprises a match key.

The instructions in the memory of the computer cause the central processor to execute functions that are generally consistent with the steps of the method discussed above. These functions include storing messages received from the plurality of sites over the non-secure computer network in the non-volatile storage. The messages include non-confidential data and the subset of the confidential data, which comprises a message key. In addition, the instructions cause the central processor to compare the match key (derived from the complete confidential data entered over the telephone) with message keys associated with messages stored in the non-volatile storage to identify the message conveyed over the non-secure computer network from said one of the plurality of sites. Once the message is identified, to complete the message, the central processor adds the confidential data conveyed over the telephone line to the message, for storage in the non-volatile storage.

Other details of the system are generally consistent with the steps of the method discussed above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
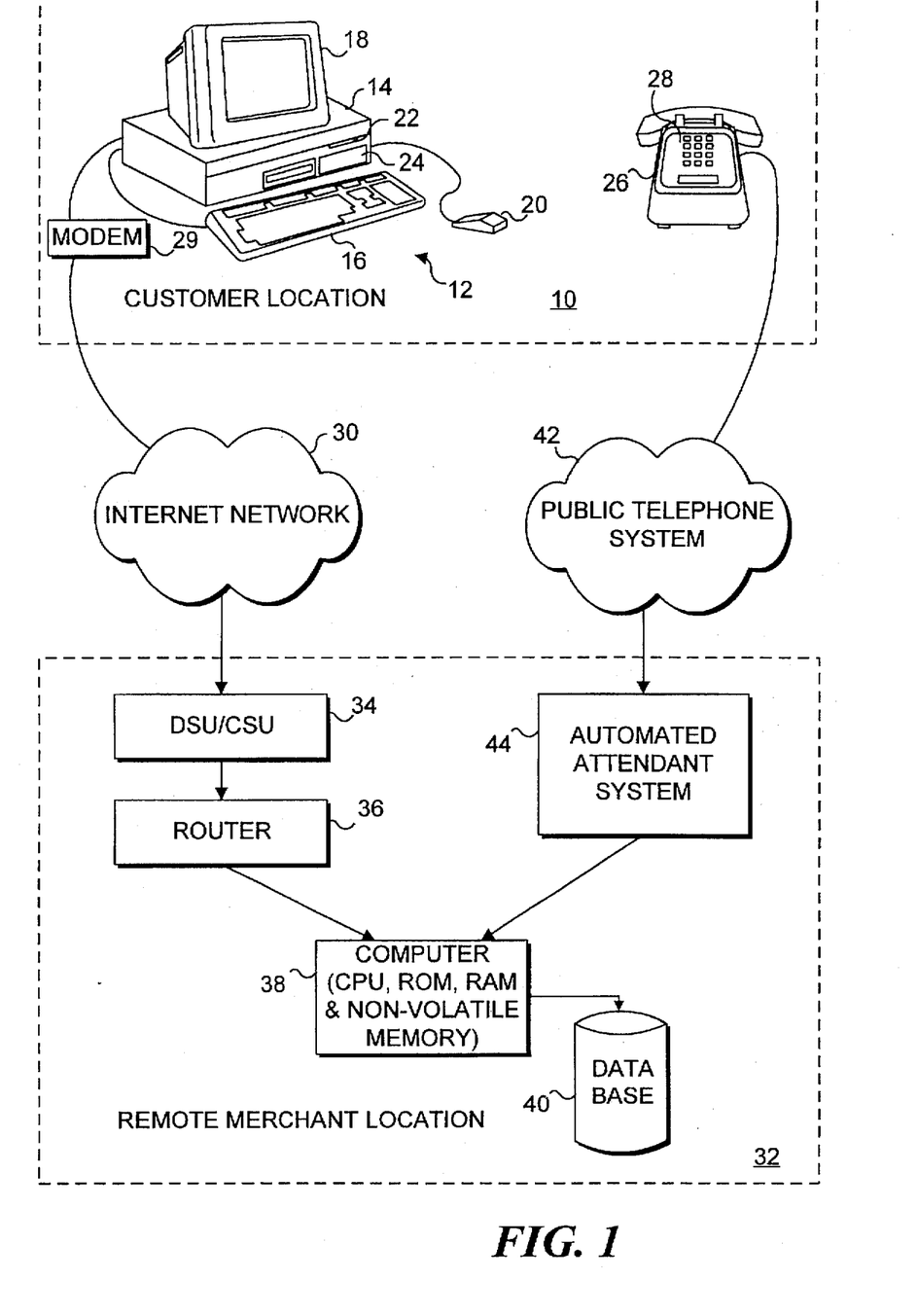
FIG. 1 is a block diagram illustrating the components involved in the communication between a customer location and a remote merchant, over a non-secure network, when entering an order charged to a credit card.

With reference to FIG. 1, the principal components used to implement the present invention are illustrated in a block diagram. At the top of the Figure, a dash line defines a customer location 10, which in many cases will be the customer's home or place of business. At customer location 10, a personal computer 12 is employed to access an on-line catalog in which various types of goods and/or services are described and/or illustrated. Personal computer 12 is generally conventional in design, comprising a processor chassis 14 within which are disposed a central processor unit (CPU) and supporting integrated circuitry. Coupled to processor chassis 14 is a keyboard 16 and a monitor 18. Personal computer 12 is controlled by the customer using keyboard 16 and a mouse 20 (optional) or other pointing device that controls a cursor used to make selections in programs executing on the personal computer. In the front panel of the processor chassis are mounted a floppy drive 22 and a hard drive 24.

Although a desktop type of personal computer is illustrated in FIG. 1, it will be understood that a laptop or other type of portable computer, a "dumb" terminal, or a personal digital assistant can also be used in connection with the present invention for placing an order. In addition, a workstation on a local area network at the customer location can be used instead of personal computer 12 for placing an order. Accordingly, it should be apparent that the details of personal computer 12 are not particularly relevant to the present invention. Personal computer 12 simply serves as a convenient interface for accessing information about goods/services that can be purchased, and for placing an order on a network.

Also disposed at customer location 10 is a generally conventional telephone 26. Preferably, telephone 26 includes a touch-tone keypad 28. However, a pulse-type telephone can also be used in connection with the present invention.

A number of private networks offer on-line shopping to members that are connected to the network. Typically, the member accesses the network over the telephone system, which is coupled to the personal computer through an internal modem (not shown) or an external modem 29. While the present invention is applicable to credit card orders placed on such private networks, in FIG. 1, personal computer 12 is shown connected to an Internet network 30. Only recently have opportunities for shopping on the Internet network become widely available. The connection between personal computer 12 and the Internet can be through a modem and telephone line via a private network service provider that is directly connected to the Internet network, through an Internet service provider who is directly connected, or via a direct high-speed data connection. The details of the type of connection to the Internet network are of no consequence in the present invention.

Internet network 30 is depicted in FIG. 1 as an amorphous shape to suggest that the details of connection with the customer and the access made by the customer are continually evolving. By making a connection to the Internet network, the customer has the ability to access sites throughout the world at which are stored on-line catalogs that can be accessed by the customer.

Once a customer has selected goods or services to be purchased from an on-line catalog, an order can be transmitted to an appropriate remote merchant location 32 via the Internet network. Although the order can be placed in real time if the customer is directly connected to the remote merchant location through the Internet, for example via the World Wide Web, it is also possible that the customer will complete an order form provided with the catalog from which the goods were selected and transmit the order form as an E-mail message to the remote merchant location through the Internet network. Orders received from a customer via Internet network 30 arrive on high-speed data lines that are coupled to a digital service unit/customer service unit (DSU/CSU) 34, such as an ADC Kentrox D-SERV™. DSU/CSU 34 is coupled to a router 36, such as a Livingston PORTMASTER™ or those made by CISCO Systems. The router is connected to a computer 38. Preferably, computer 38 comprises a SUN SPARC5™ minicomputer, which includes a CPU, RAM, ROM, and non-volatile storage (a high-speed hard drive—not separately shown). In the memory of computer 38 are stored application programs that execute on the CPU. Among these programs for use in the present invention are an ORACLE™ database management system and custom software. The programs or software comprise machine instructions that instruct the CPU within computer 38 to implement the steps of the present invention, generally as explained below.

An order received from customer location 10, which is exemplary of many other customer locations from which orders are input to computer 38, is processed by the computer database management system and custom software executing on the computer for storage in a database 40. This database is maintained on the non-volatile storage.

Computer 38 also processes data input by customers using a public telephone system 42. Again, the public telephone system is illustrated as having an amorphous shape to indicate that it is a complex system that can involve many thousands of components, including signals conveyed by land lines, satellite, and/or optical fibers. The details of the public telephone system are, however, not important in the present invention. It simply represents a communication link between the customer locations and remote merchant location 32 that is substantially more secure than a network such as the Internet.

In order to complete an order that was previously placed, the customer is instructed on the order form or in the catalog to call a specific 800 (or other) number that is coupled to the remote merchant location. The customer makes the call using telephone 26, which is coupled to public telephone system 42, or using any other public telephone. The public telephone system conveys the customer's call to an automated attendant system 44, which is disposed at the remote merchant location 32. When the call is connected, automated attendant system 44 prompts the customer to enter a credit card account number, which is subsequently input to computer 38 to be inserted into the order placed by the customer, and stored on database 40.

It is contemplated that one of several digital systems presently sold by Dialogic, Rhetorex, and Applied Voice Technology may be used for automated attendant system 44. Automated attendant systems are commonly used for voice mail and audiotex services, e.g., "movie phone." Such systems include programmable digitized voice subsystems for responding to incoming calls in an automated manner, and are also able to automatically connect a customer to a human operator if the automated responses are unable to deal with a problem, if the customer enters a touch-tone code that indicates assistance is required, or if the customer is not calling from a touch-tone phone.

As discussed above in the Background of the Invention, public networks such as Internet network 30 are notoriously lacking in security for transmission of sensitive data, such as credit card numbers. Very few customers are willing to enter their credit card number on an order form that will, for example, be E-mailed on the Internet network, because the network is not secure and the credit card number may be readily discovered by someone who will use it improperly.

Figure 2:
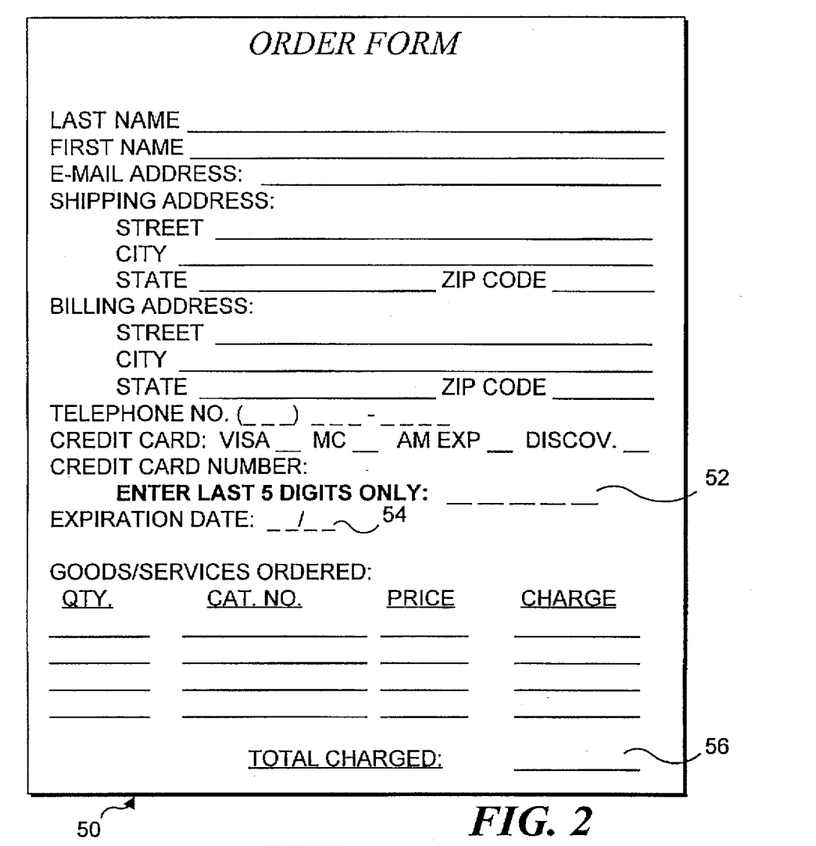
FIG. 2 illustrates an exemplary order form that includes an entry block for a subset of the customer's credit card number, which will serve as an order key.

However, when placing an order for goods or services using the present invention, the customer is not required to enter a complete credit card number in the order to be E-mailed or otherwise transmitted on the network. An exemplary order form 50 for use in ordering goods or services in connection with the present invention is shown in FIG. 2. On this order form, in addition to the normal data required to complete an order, including the customer's name, E-mail address, shipping address, billing address, telephone number, and identification of the goods/services being ordered, the customer is requested to identify the specific credit card being charged, and to enter only a specific portion of the credit card number. In this example, ONLY the last five digits of the twelve or sixteen digits comprising the typical credit card number are entered on the form, at a block 52. Although the preferred embodiment specifies that the last five digits of the complete credit card account number be entered in block 52, it will be appreciated that either fewer or more than five digits of the credit card number can be entered instead.

Alternatively, the customer might be instructed to enter the first n digits; however, this alternative is less likely, because many of the first digits are the same for a large number of credit cards. This detail is relatively unimportant, so long as the customer is only required to enter a relatively small subset of all the digits comprising the credit card account number. Other pertinent information, such as the expiration date of the credit card, is entered in a block 54. Finally, the total charged on the credit card is entered manually by the customer or automatically entered by the system in a block 56. After the customer completes the order for transmission to the remote merchant location as an E-mail message, or for transmission in real time directly to the remote merchant location via the Internet network, it is contemplated that the customer would optionally be enabled to print order form 50 or store it on a hard drive (not shown), thereby providing the customer a record of the information entered when placing the order.

The portion of the credit card account number entered in block 52 serves as an order key (not necessarily unique) for all of the data on order form 50 that are transmitted to remote merchant location 32, processed by computer 38, and entered into database 40. To finalize the order, it is necessary for the complete credit card account number to be added to the other data regarding the order stored in database 40.

In order to convey the complete credit card data to the remote merchant location, the customer is instructed to call the 800 number or other number that connects with automated attendant system 44. Preferably, the E-mail order (or other electronic order) should have been processed and entered into database 40 prior to the customer placing the telephone call. For this reason, the customer may be instructed to wait a predefined time (assuming that the order is not placed in real time and immediately entered into database 40 at the time the customer is connected to remote merchant location 32) before calling the remote merchant location. Alternatively, after storing the data on the order form, computer 38 can instruct automated attendant system 44 to call telephone 26 at customer location 10, enabling a digital voice to advise the customer that the order should be completed by entering the complete credit card account number on the telephone. As a further alternative, the customer can place the telephone call to enter the complete credit card number into database 40 prior to the order form being received and processed by computer 38. It will be apparent that either the complete credit card number, or the data on the order form can be entered into database 40 before the other, since the portion of the credit card number entered on the order form as the order key normally enables the complete credit card number and order form to be matched, irrespective of which arrived or was entered into the database first.

Figure 3:
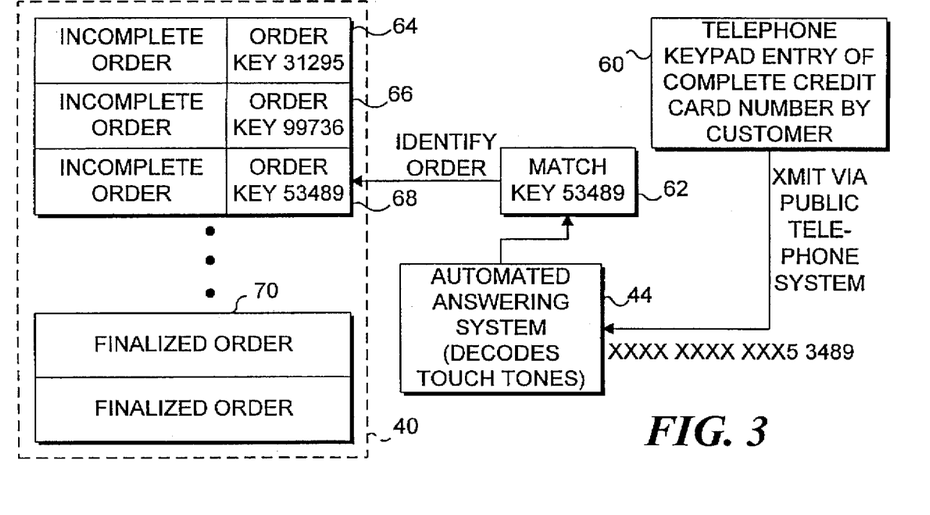
FIG. 3 is a block diagram showing how the customer completes the order by entering the credit card number on the telephone.

The steps of the method used for finalizing an order with the complete credit card number are illustrated in a block diagram in FIG. 3. When the customer places a telephone call to the automated attendant system at the remote merchant location, a digital voice on automated attendant system 44 instructs the customer to enter or key-in the complete credit card number on touch-tone keypad 28 (FIG. 1). As each digit is entered on the keypad, the telephone generates a corresponding touch-tone signal having a specific frequency. The frequencies of these signals are received and processed by automated attendant system 44 to recover the digits comprising the credit card number that was entered by the customer. In the example shown in FIG. 3, the customer enters sixteen digits comprising the credit card number, the first eleven of which are each represented in the drawing figure by an "X." Automated attendant system 44 decodes the touch tones and provides the corresponding credit card digits to computer 38, which derives a match key 62 that comprises the last five digits. In the example of FIG. 3, match key 62 consists of the digits "53489." Computer 38 must then identify the incomplete order to which the credit card data applies. In this example, the matching incomplete order was received earlier and stored in database 40. To identify the matching incomplete order, computer 38 compares match key 62 to the corresponding order keys of the incomplete orders stored in the database.

Only a few of the incomplete orders stored in database 40 are illustrated in FIG. 3. One incomplete order has an associated order key 64 with the digits "31295." Another incomplete order has an associated order key 66 with the digits "99736." The computer determines that match key 62 has the identical digits of an order key 68, and since no other incomplete order has the identical order key digits, the incomplete order associated with order key 68 is very likely to be the incomplete order previously placed by the customer currently placing the telephone call. Once the incomplete order is identified and continued by the customer, computer 38 enters the complete credit card information into the order, producing a finalized order 70.

Figure 4:
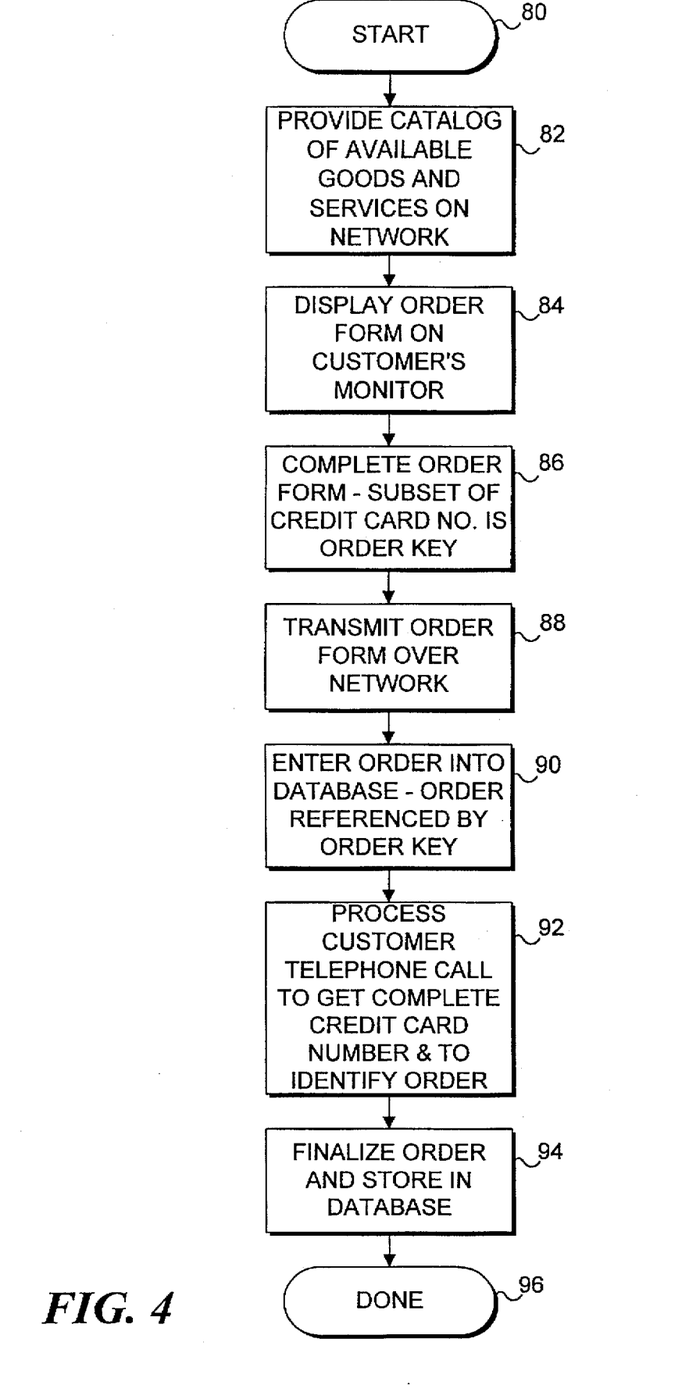
FIG. 4 is a flow chart showing the steps for placing an order in accord with the present invention.

Further details of the process for entering an order on credit over an non-secure network are illustrated in the flow chart shown in FIG. 4, beginning at a start block 80. In a block 82, a catalog or other information describing goods and services that can be ordered on the Internet network is provided to prospective customers, typically by displaying the information using the customer's computer. It is also possible to mail printed catalogs or CD-ROMs to prospective customers, enabling the customer to enter an order for selected goods or services over the Internet network (or other network) as explained above.

In a block 84, an order form generally like order form 50 is displayed on monitor 18 at the customer's location. The order form can be included with the on-line catalog or transmitted to the customer by the merchant if the connection to the remote merchant location is in real time. In the next step, described in a block 86, the customer completes the order form. As noted above, the data entered on the form includes the subset or portion of the complete credit card number, which is used as the order key. Thereafter, in a block 88, the customer transmits the completed order form over the network to the remote merchant location in real time or as an E-mail message. As used herein and in the claims that follow, the term "form" is intended to encompass an E-mail message, a World Wide Web form, or any other means that the user employs to place an order (or transmit another type of message, a portion of which is confidential, as described in connection with this invention). Once the order is received at the remote merchant location, it is processed by computer 38 to extract the order data, which are entered into database 40 in a block 90, as an incomplete order. Associated with the incomplete order is the order key, which serves as a reference to match the complete credit card number that is provided by the customer during the telephone call, generally as explained above in connection with FIG. 3.

A block 92 indicates that the telephone call placed by the customer is processed in order to obtain the complete credit card number, and from that, to obtain the match key necessary to identify the incomplete order that was placed by the customer over the network. Although it is somewhat unlikely that two different customers will have placed orders having identical order keys, i.e., the same last five digits in their credit card number, provision must be made for this possibility. The details involved in processing a customer telephone call to identify the order in block 92 are shown in further detail in FIGS. 5A and 5B.

Figure 5A:
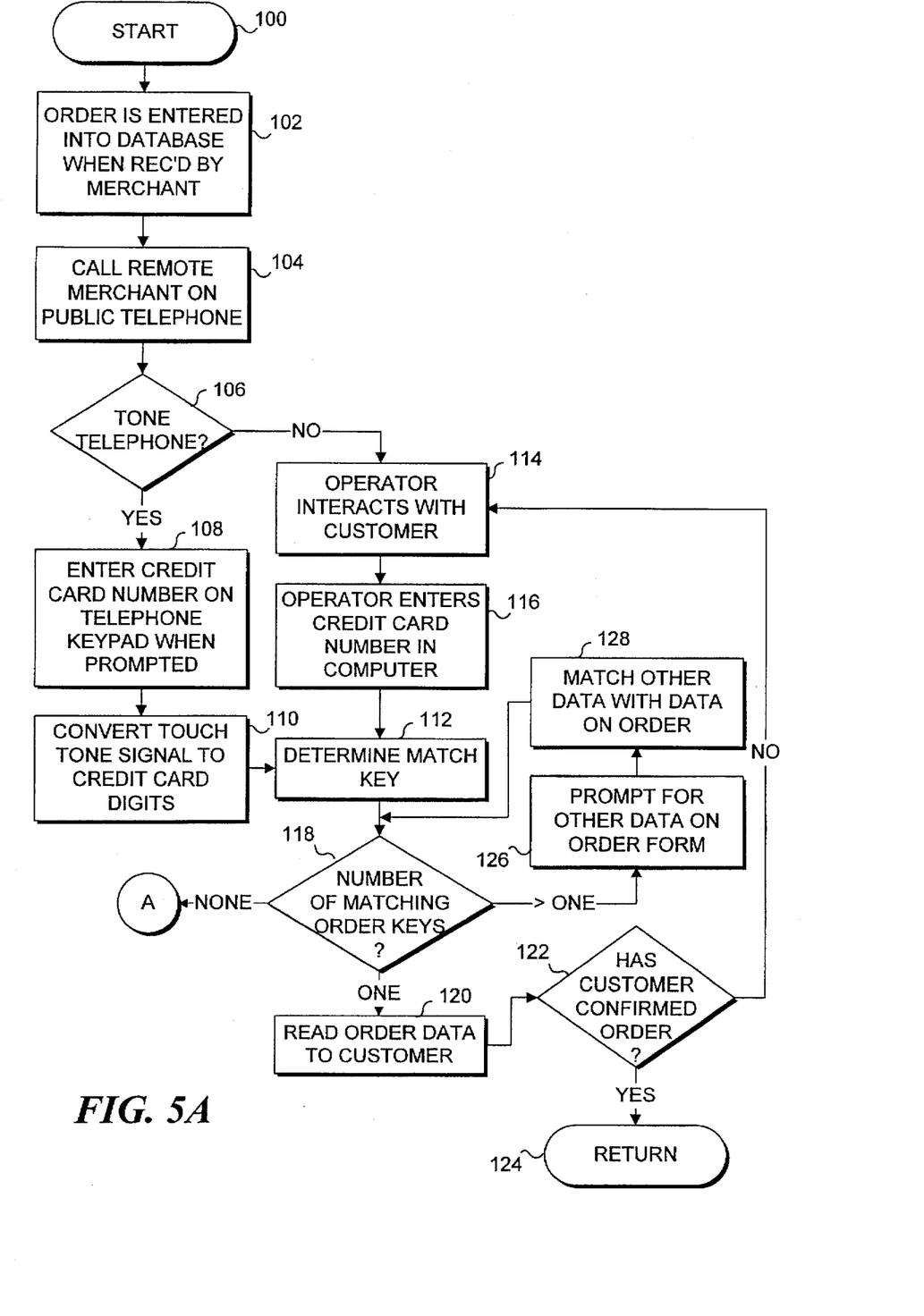
FIGS. 5A and 5B are a flow chart illustrating the steps implemented when processing a customer's telephone call to identify an order into which the credit card number should be inserted.
Figure 5B:
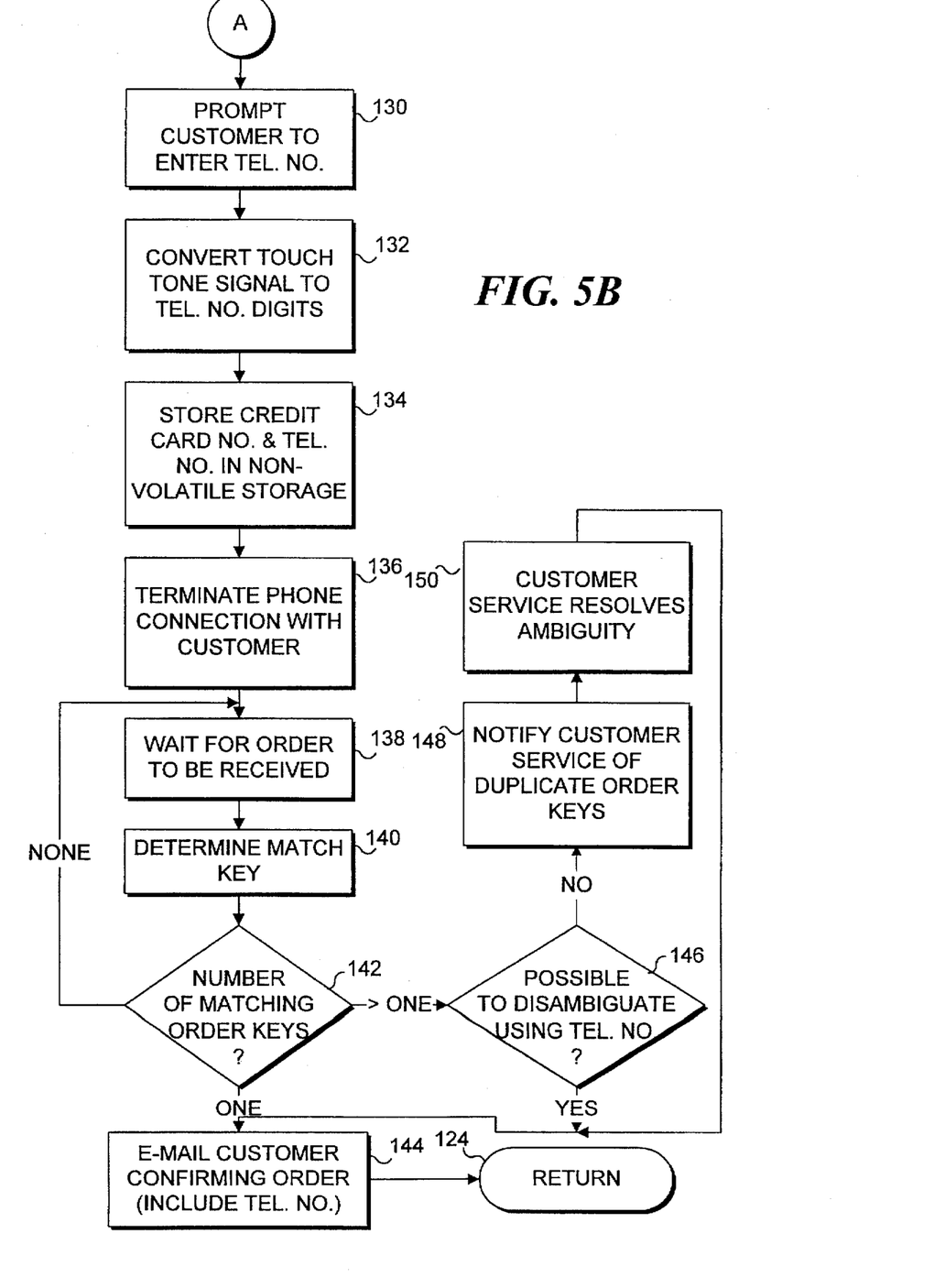

With reference to FIGS. 5A and 5B, processing of the telephone call received from the customer begins at a start block 100. Once an order is received from a customer, it is entered into the database as provided in a block 102. In a block 104, the customer places a telephone call to the remote merchant on the public telephone system. As an alternative, after receiving an order from a customer, computer 38 can cause the automated attendant system to initiate a telephone call to the customer from the remote merchant location, using the telephone number entered on the order form, or computer 38 can send an E-mail request to the customer at the E-mail address on the order form asking the customer to place a telephone call for purposes of communicating the complete credit card number. In any case, once the customer is in telephone communication with the remote merchant location, a decision block 106 determines if the telephone in use by the customer is a touch-tone type telephone. This determination can be made simply by instructing the customer to enter the complete credit card number to which the order previously placed is to be charged if calling from a touch-tone type phone, and to stay on the line if not. If the customer does not understand or is unable to enter the number on a pulse-type telephone, automated attendant system 44 waits for a time-out interval, e.g., ten seconds, to expire. If no touch-tone signal is received by the end of the time-out interval, the automated attendant system transfers the customer's call to a human operator or customer service representative.

In most cases, the customer will have a touch-tone telephone, and the logic will continue at a block 108, which indicates that the customer enters the complete credit card number on the telephone keypad as prompted by the digitized voice on automated attendant system 44 (or verbally, as requested by a human operator if the customer does not have a touch-tone telephone). In a block 110, the automated attendant system converts the touch-tone signals received over the public telephone system to the corresponding credit card digits for input to computer 38. Optionally, computer 38 can verify that the credit card number is a valid credit card number by using the check digit typically encoded into the credit card number. Upon receiving the credit card digits, computer 38 determines a match key from the last five digits, as indicated in a block 112.

If the customer does not have a touch-tone telephone or does not respond to the prompt to enter the credit card number, the logic proceeds to a block 114 where the human operator requests that the customer provide the credit card number verbally. It should be noted that an automated voice recognition system can alternatively be used for input of the complete credit card number, for processing by computer 38 as described above. However, use of a human operator is likely to minimize errors in entering the credit card number if a touch-tone phone is not available. Other problems can also be resolved by the human operator or customer service representative at this point. In a block 116, the human operator enters the credit card numbers into computer 38, which processes the numbers in the same manner as if they were provided by automated attendant system 44. In either case, the computer determines the match key leading to a decision block 118.

In decision block 118, computer 38 checks for multiple matching order keys. In other words, two or more incomplete orders having order keys identical to the match key determined in block 112 represent an ambiguity that must be resolved. If only one matching order key is found, the logic proceeds to a block 120. In block 120, automated attendant system 44 is supplied at least a portion of the data from the order previously stored in database 40. The digital voice of the automated attendant system then reads that portion of the data back to the customer. For example, the total amount charged from block 56 or the customer's telephone number that was entered on order form 50 can be read back. In a decision block 122, computer 38 determines if the customer has confirmed the order. To confirm that the order has been properly identified, the customer can enter a specified touch-tone key, or different touch-tone keys to either cancel the order or indicate that an error was noted in the order. If confirming the order with a human operator, the customer simply would indicate verbally that the proper order has been identified, so that the human operator can enter the verification into computer 38. Once the confirmation is received by the computer, the logic proceeds to a block 124, which returns to the main program shown in FIG. 4. If the customer does not confirm or cancel the order, the logic jumps to block 114 for resolution of the problem by the human operator. At this point, the automated attendant system transfers the call to the human operator. The operator may request that the customer verbally recite the complete credit card number so that the operator can enter the credit card number into the computer, thereby possibly correcting errors in the entry by the customer. The operator can also field questions and handle other problems that arise in the order entry process. The confirmation process occurring in block 120 and decision block 122 is optional and not integral to this invention. In the case where this confirmation process is omitted, if only one matching order key is found in decision block 118, then the logic proceeds directly to block 124.

Returning back to decision block 118 in FIG. 5A, if more than one order key equal to the match key is detected in the database by computer 38, the logic proceeds to a block 126 in which the customer is prompted to enter other data on the telephone that were previously submitted on the order form. Such data may include the expiration date of the credit card or an order number (not shown) from order form 50. The other data are received by the automated attendant system and converted into digital data for input into computer 38. In a block 128, computer 38 matches the other data entered by the customer with data on the order form previously stored in database 40. The additional data entered by the customer on the telephone should be sufficient to resolve any ambiguity in order keys so that the computer can identify the specific order previously transmitted by the customer for entry into the database. If not, decision block 118 will again indicate that duplicate order keys still exist, returning back to block 126 for entry of still additional data, such as the customer's telephone number, to resolve the ambiguity.

The remaining possibility at decision block 118 is that no order key was found equal to the match key. Most likely, this situation will arise if the customer calls the merchant to enter the complete credit card number on the telephone before the order was received and stored in the database, or if the customer enters the credit card number incorrectly. Though not shown in FIG. 5B, the system could prompt the customer to reenter the credit card number at this point in order to verify that it has been keyed in correctly. If the customer keys in the credit card number differently the second time, the customer can be prompted to key in the number a third time or can simply be transferred to a human operator. The flowchart continues with a block 130 in FIG. 5B, which provides for prompting the customer to enter his/her telephone number, using the touch-tone keypad (or by reciting the number verbally to a human operator if the customer is not using a touch-tone phone). The telephone signal is received at the merchant location and converted into the corresponding telephone digits in a block 132. In a block 134, the telephone number and the credit card number are stored in database 40. The customer is then instructed to hang up the telephone to terminate the phone connection, in a block 136. Though prompting the customer to enter his/her phone number as provided in block 130, has certain advantages (such as making it possible to contact the customer in the case that an order with a matching order key is never received), this step is optional.

As noted in a block 138, the system waits for the order previously transmitted over the Internet or other network to be received at the merchant location and stored in database 40. In a block 140, a match key is determined from the five digits of the credit card data previously entered by the customer during the telephone call. A decision block 142, which is analogous to decision block 118, determines the number of matching order keys, and if none, returns to block 138 to await receipt of the order. If only one matching order key is detected, a block 144 provides for transmitting an E-mail to the customer confirming the order and including the telephone number entered by the customer during the telephone call (assuming that the customer entered his/her telephone number in block 130). Including the customer's telephone number in the E-mail message sent to the customer enables the customer to verify that the system has associated the complete credit card number and telephone number with the correct order. This verification is possible because the E-mail address to which the E-mail message is directed is entered into the database, along with the order information, and the telephone number is entered into the database along with the complete credit card information during the same telephone call. Of course, if the customer also entered his/her telephone number along with the order information, then the system can be programmed to verify that the telephone number entered along with the order is the same as the telephone number entered during the telephone call. Thereafter, the logic returns to the main routine in block 124. If more than one matching order key is detected in decision block 142, the logic proceeds to a decision block 146. In this decision block, the computer system determines if it is possible to disambiguate the duplicative order keys by comparing the telephone number entered by the customer during the telephone call (assuming that the telephone number was then entered) with that in the order data. If so, the logic returns in block 124. If the response to the inquiry of decision block 146 is negative, the logic proceeds to a block 148, wherein the customer service representative is notified of the duplicate order keys. As noted in a block 150, customer service resolves the ambiguity, possibly by placing a telephone call or sending an E-mail message to the customer(s) having the duplicate order keys, and the logic returns to the main routine at block 124.

Referring back to FIG. 4, a block 94 provides for finalizing the order and storing the order with the complete credit card number in database 40 until the goods or services ordered by the customer have been provided. In a block 96, the process is concluded.

While the preferred embodiment of the present invention has been described in connection with completing orders, it will be appreciated that the present invention can also be used to complete the establishment of a customer "account," i.e., entering a customer's credit card data in a file, in anticipation of using the credit card numbers for billing future orders placed by the customer, or to complete an order and simultaneously establish an account for future orders. Once the complete credit card data are on file and associated with a customer name or customer ID (the customer's E-mail address might, for example serve as the customer ID), subsequent orders can be placed simply by referencing the customer name and/or ID possibly together with the last five digits of the credit card number and possibly the credit card type (e.g., MASTERCARD™, VISA™, AMERICAN EXPRESS™, or DISCOVER™) and the card expiration date. In all but the most unlikely cases, the customer name, last five digits of the credit card, the card type, and the card expiration date, taken together, should uniquely and correctly associate the customer with the customer's complete credit card number that is stored in the data file. It is possible that two customers will coincidentally share the same name and use the same type of credit card having the same last five digits and the same expiration date, but such an occurrence is extremely unlikely. Should such an unlikely duplicate association occur, the computer system would alert a customer service representative who would clarify the situation by communicating with the customer(s) by phone and/or E-mail. As a final check, the system can be programmed to generate an E-mail message to the customer confirming the order just received. Any customer receiving such a confirmation who had not placed an order would most likely take steps to inform the merchant of the mistake.

More generally, although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for communicating confidential data and non-confidential data to an intended recipient at a remote location, comprising the steps of:
   (a) transmitting the non-confidential data and a portion of the confidential data to the intended recipient over a non-secure network, said portion of the confidential data comprising a message reference key;
   (b) transmitting the confidential data in a complete form to the intended recipient over a secure network;
   (c) comparing a portion of the confidential data in the complete form received at the remote location over the secure network to the message reference key received over the non-secure network to match the non-confidential data with the confidential data in the complete form; and
   (d) combining the confidential data in the complete form that were received at the remote location with the non-confidential data matched therewith to form a complete message.

2. A method for communicating credit card data in connection with a message transmitted over a non-secure network, comprising the steps of:
   (a) transmitting the message over the non-secure network from a local computer, said message including only a portion of the credit card data;
   (b) receiving the message with the portion of the credit card data at a remote location that is coupled to the non-secure network, said message being added to a database;
   (c) calling the remote location via a secure network to finalize the message by entering complete credit card data; and (d) matching the message containing the portion of the credit card data with the complete credit card data by comparing the portion of the credit card data that was included in the message with a corresponding portion of the complete credit card data that was entered via the secure network, said complete credit card data thereby being matched with and entered into the message in the database.

3. The method of claim 2, wherein the credit card data include a plurality of digits, said portion of the credit card data that is included with the message comprising a predefined subset of the digits of the credit card data, the number of digits in said subset being less than all of the digits of the credit card data.

4. The method of claim 2, wherein the secure network couples the local computer with the remote location over a telephone line.

5. The method of claim 4, wherein the step of entering the complete credit card data comprises the step of keying the credit card data into a telephone keypad so that the message is completed automatically without clerical assistance.

6. The method of claim 4, further comprising the step of entering additional identifying data via a telephone in the event that a duplicate entry of the portion of the credit card data is found in the database, said additional identifying data being compared to corresponding identifying data in the messages on the database to identify the message into which the complete credit card data should be entered.

7. The method of claim 4, further comprising the steps of automatically reading back at least a part of the finalized message on a telephone; and enabling an entry to be made thereafter during the telephone call, to confirm the finalized message.

8. The method of claim 2, further comprising the step of providing clerical assistance during the step of calling the remote location via the secure network, if a problem arises in automatically finalizing the message.

9. A method for entering an order and/or establishing an account over a non-secure computer network, to make a purchase on credit by reference to a credit card number, comprising the steps of:

(a) completing a form that includes purchaser data and a predefined subset of the credit card number, said subset of the credit card number comprising an order key;

(b) transmitting data entered to complete the form to a remote location over the non-secure computer network;

(c) storing said data in a database of an automated order entry system, said data being associated with a specific customer;

(d) placing a telephone call to the remote location and entering the complete credit card number, a subset of said number that corresponds to the subset of the credit card number entered on the form comprising a match key;

(e) comparing the match key to the order keys stored in the data base to identify the data entered in the form previously stored in step (c) and to associate the telephone call with the specific customer with which said data are associated; and (f) adding the complete credit card number to said data, to complete an order and/or to establish an account for placing subsequent orders for said specific customer.

10. The method of claim 9, further comprising the step of enabling confirmation that the data and specific customer have been correctly identified, by making an entry on the telephone.

11. The method of claim 10, further comprising the step of playing back at least some of the data entered to complete the form using a recorded voice, to determine whether any errors exist and to determine that the correct data previously stored have been identified.

12. The method of claim 9, further comprising the step of entering other data on the telephone to differentiate between a plurality of customers having identical order keys, said other data also being transmitted on the non-secure computer network, thereby enabling the data entered on the form by the specific customer and previously stored to be identified from among the data entered by the plurality of customers having identical order keys, using both the match key and the other data.

13. The method of claim 9, further comprising the step of providing operator assistance to a customer if a problem arises during the telephone call.

14. The method of claim 9, further comprising the step of purging the order key after the order key is matched with a complete credit card number.

15. The method of claim 9, wherein the step of entering the complete credit card number comprises the step of keying said number into a telephone touch-tone keypad.

16. The method of claim 12, wherein the other data comprises an expiration date for the credit card.

17. The method of claim 12, wherein the step of entering other data on the telephone comprises the step of verbally prompting a customer with a plurality of options for entry on a telephone touch-tone keypad during a telephone call, to differentiate between the plurality of customers having identical order keys.

18. The method of claim 9, further comprising the step of placing a telephone call to each customer placing an order to prompt for entry of the complete credit card number of said customer as provided in step (d).

19. The method of claim 9, further comprising the step of transmitting a request to a customer placing an order via the non-secure computer network, said request prompting said customer to place a telephone call to the remote location for entry of the complete credit card number of said customer.

20. The method of claim 9, wherein if the telephone call is placed to the remote location to enter the complete credit card number before the data entered to complete the form are stored in the database, further comprising the step of storing the complete credit card number in the database for subsequent comparison of the match key derived from said complete credit card number to the order key included in said data when said data are received.

21. A system for receiving messages from a plurality of sites, each message including non-confidential data and a subset of confidential data, said non-confidential data and said subset of the confidential data being conveyed as a message to an intended recipient using a non-secure transmission method, to be completed by adding the complete confidential data, which are transmitted to the intended recipient using a secure transmission method, comprising:

(a) a computer for use in receiving said messages, said computer having a central processor that executes instructions, a memory for storing instructions to be executed, and non-volatile storage for storing the messages;

(b) an automated attendant system, coupled to the computer, for automatically answering a communication from one of the plurality of sites, said communication having been placed to enter the complete confidential data into the computer using the secure transmission method, a portion of the complete confidential data thus entered, which corresponds to the subset of the confidential data, comprising a match key; and (c) said instructions in the memory of the computer causing the central processor to:
  (i) store the messages received from the plurality of sites using the non-secure transmission method in the non-volatile storage, said messages including the non-confidential data and the subset of the confidential data, said subset comprising an order key;
  (ii) compare the match key with the order keys associated with messages stored in the non-volatile storage to identify the message conveyed using the non-secure transmission method from said one of the plurality of sites and to associate the complete confidential data conveyed using the secure transmission method with said message; and
  (iii) adding the complete confidential data conveyed using the secure transmission method to the message thus identified, for storage in the non-volatile storage, to complete the message.

22. The system of claim 21, wherein the automated attendant system prompts for entry of the confidential data during the communication using the secure transmission method.

23. The system of claim 21, wherein said automated attendant system includes automated voice means for producing verbal instructions; and wherein, after the central processor has used the match key to identify the message with which the complete confidential data are associated, the automated voice means read at least a portion of the non-confidential data of the message that was identified and prompts for confirmation that the message has been correctly identified.

24. The system of claim 21, wherein if a duplicate order key is stored in the non-volatile storage for a plurality of messages so as to create an ambiguity in identifying the message associated with the complete confidential data, the central processor causes the automated attendant system to verbally prompt for entry of a specific portion of the non-confidential data comprising the message, in addition to prompting for entry of the complete confidential data, said specific portion of the non-confidential data being compared by the central processor to a corresponding portion of the non-confidential data from the plurality of messages with the duplicate order key, to resolve the ambiguity and identify the message associated with the complete confidential data.

25. The system of claim 24, wherein the automated attendant system verbally offers a plurality of options for entry on a telephone touch-tone keypad during a telephone call to resolve the ambiguity.

26. The system of claim 21, wherein the confidential data comprise a credit card number.

27. The system of claim 21, wherein the secure transmission method provides for communicating over a telephone and wherein the automated attendant system includes means for connecting a telephone call to a human attendant, if a problem arises that is not resolved by the automated attendant system.

28. The system of claim 21, wherein the automated attendant system places a telephone call to each of the plurality of sites to prompt for entry of the complete confidential data associated with messages received by the intended recipient from each of the plurality of sites.

29. The system of claim 21, wherein the instructions cause the central processor to transmit a request transmitted using the non-secure transmission method to said one of the plurality of sites, said request prompting for a telephone call to be placed to enter the complete confidential data associated with the message from said one of the plurality of sites.

30. The system of claim 21, wherein if the complete confidential data are entered before the message to be associated with the confidential data referenced by the match key is stored, the instructions cause the central processor to store the complete confidential data in the non-volatile storage for subsequent association with said message after the message is received using the non-secure transmission method.

31. The system of claim 21, wherein the instructions cause the central processor to purge the order key after the order key is matched with the complete confidential data based upon the match key.

* * * * *